United States Patent
Przybysz et al.

(10) Patent No.: US 8,844,011 B2
(45) Date of Patent: Sep. 23, 2014

(54) IP MULTIMEDIA SUBSYSTEM USER IDENTITY HANDLING METHOD AND APPARATUS

(75) Inventors: Hubert Przybysz, Hägersten (SE); Bo Åström, Stockholm (SE); John C Baldwin, Coventry (GB); Jonas Falkenå, Huddinge (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 25 days.

(21) Appl. No.: 13/576,204

(22) PCT Filed: Feb. 12, 2010

(86) PCT No.: PCT/EP2010/051802
§ 371 (c)(1),
(2), (4) Date: Oct. 19, 2012

(87) PCT Pub. No.: WO2011/098138
PCT Pub. Date: Aug. 18, 2011

(65) Prior Publication Data
US 2013/0081123 A1    Mar. 28, 2013

(51) Int. Cl.
*H04L 29/00* (2006.01)
*H04L 29/06* (2006.01)
*H04W 12/04* (2009.01)
*H04W 80/10* (2009.01)

(52) U.S. Cl.
CPC ........... *H04L 65/1016* (2013.01); *H04W 80/10* (2013.01); *H04L 65/104* (2013.01); *H04L 65/1069* (2013.01); *H04L 63/062* (2013.01); *H04L 63/10* (2013.01); *H04L 63/067* (2013.01); *H04W 12/04* (2013.01)
USPC ............... 726/7; 726/6; 713/155; 713/168; 713/182

(58) Field of Classification Search
CPC ........................................ H04L 63/62
USPC ................ 726/7; 709/225; 713/100
See application file for complete search history.

(56) References Cited

U.S. PATENT DOCUMENTS 7,908,484 B2 * 3/2011 Haukka et al. ................. 713/181
2005/0283614 A1 * 12/2005 Hardt ............................. 713/182

(Continued)

FOREIGN PATENT DOCUMENTS

WO    2006115479 A1    11/2006

OTHER PUBLICATIONS

"NGN architecture: generic principles, functional architecture, and implementation"; Knightson et al; IEEE Communications Magazine, Oct. 2005.*

(Continued)

*Primary Examiner* — Jason Lee
(74) *Attorney, Agent, or Firm* — Coats & Bennett, PLLC

(57) ABSTRACT

A method of enabling users of a third party Internet service, who are not necessarily subscribers of an IP Multimedia Subsystem, IMS, network, to access services provided by the IMS network. The method comprises registering a user with said third party Internet service via the Internet using an Internet service identity of the user, and sending to the user, from said third party Internet service and via the Internet, IMS network access information. The access information is then used to register the user with the IMS network, wherein, following IMS registration, the user is able to access IMS network services.

18 Claims, 11 Drawing Sheets

(56) References Cited

U.S. PATENT DOCUMENTS

| | | | |
|---|---|---|---|
| 2009/0119699 A1* | 5/2009 | Crassous et al. | 725/25 |
| 2010/0182985 A1* | 7/2010 | Guenther et al. | 370/338 |
| 2011/0004758 A1* | 1/2011 | Walker et al. | 713/168 |
| 2011/0188446 A1* | 8/2011 | Bienas et al. | 370/328 |

OTHER PUBLICATIONS

Van Thanh, D. et al. "Authentication in a multi-access IMS environment." IEEE International Conference on Wireless & Mobile Computing, Networking & Communication, Oct. 12-14, 2008, pp. 613-618.

* cited by examiner

IP MULTIMEDIA SUBSYSTEM USER IDENTITY HANDLING METHOD AND APPARATUS

TECHNICAL FIELD

The present invention relates to a method and apparatus for handling IP Multimedia Subsystem identities, and in particular, though not necessarily, to such a method and apparatus for handling the allocation of IP Multimedia Subsystem identities to users of a third party service.

BACKGROUND

The IP Multimedia Subsystem (IMS) is the technology defined by the Third Generation Partnership Project (3GPP) to provide IP multimedia services over mobile communication networks. IP multimedia services can provide a dynamic combination of voice, video, messaging, data, etc. within the same session. The IMS makes use of the Session Initiation Protocol (SIP) to set up and control calls or sessions between user terminals. The Session Description Protocol (SDP), carried by SIP signals, is used to describe and negotiate the media components of the session. Whilst SIP was created as a user-to-user protocol, the IMS allows operators and service providers to control user access to services and to charge users accordingly.

FIG. 1 illustrates schematically how the IMS fits into the mobile network architecture in the case of a General Packet Radio Service (GPRS) access network. As shown in FIG. 1, control of communications occurs at three layers (or planes). The lowest layer is the Connectivity Layer 1, also referred to as the bearer or user plane, and through which signals are directed to/from user equipment (UE) accessing the network. The entities within the connectivity layer 1 that connect an IMS subscriber to IMS services form a network that is referred to as the IP-Connectivity Access Network, IP-CAN. The GPRS network includes various GPRS Support Nodes (GSNs). A Gateway GPRS Support Node (GGSN) 2a acts as an interface between the GPRS backbone network and other networks (radio network and the IMS network). The middle layer is the Control Layer 4, and at the top is the Application Layer 6.

The IMS 3 includes a core network 3a which operates over the Control Layer 4 and the Connectivity Layer 1, and a service network 3b. The IMS core network 3a includes nodes that send/receive signals to/from the GPRS network via the GGSN 2a at the Connectivity Layer 1, as well as network nodes (including Call/Session Control Functions (CSCFs) 5) which operate as SIP proxies within the IMS in the Control Layer 4.

The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF. The top, Application Layer 6 includes the IMS service network 3b. Application Servers (ASs) 7 are provided for implementing IMS service functionality.

3GPP specifications (TS 23.228) mandate that every IMS core network subsystem subscriber shall have one or more IMS Private User Identities (IMPI). An IMPI is assigned by the subscriber's home network operator, and is used for IMS registration (i.e. for authorization and authentication purposes). This identity shall take the form of a Network Access Identifier (NAI) as defined in RFC 2486. It should be noted that a subscription may be attached to a person or to an organisation such as a corporation. Nonetheless, in the following discussion the term "user" is used synonymously with the term "Private User Identity".

A user may have one or more IMS Public User Identities (IMPUs). The Public User Identity/Identities is/are used by any user for requesting communications to other users (in the form of SIP URI—IETF RFC 3261 [26]— or a TEL URL— IETF RFC 3966). The relationship between IMPUs and IMPIs is defined by 3GPP Rel-6 onwards. A user registers a contact address for an IMPU with the IMS core network, using the SIP Register method. This contact address might, for example, be an IP address currently allocated to the user.

In the current IMS operational architecture it is the IMS operator who allocates IMPUs and IMPIs to users, on the basis that there is a business relationship between the users and the IMS network operator. It will of course be appreciated that Users IDs (that is IMPUs and IMPIs) consume resources within the IMS network, primarily within the Home Subscriber Server (HSS) that holds the user profiles; each IMS user has a permanent HSS user profile.

Many companies now provide services via a web site hosted on the Internet. These companies are referred to as Web Service Providers (WSPs), and the service provided by their web site provides is referred to as a third party Internet service.

Many WSPs, such as EBAY™ and GOOGLE™, have their own user subscription databases in order, for example, to allows users to access a premium service (paid or unpaid) once they have signed-up and entered some user-id and password into the WSP user database. Subscribers to a given WSP represent a community of users having some common interest in the service/information supplied by the WSP.

The IMS provides a managed multimedia network with security and QoS capabilities. Whilst the IMS is primarily intended for establishing multimedia sessions between users, it may also be used to establish sessions between network servers and users. This makes IMS networks potentially valuable to WSPs, where the IMS network is exposed to the WSPs via some HTTP interface such as REST or SOAP. In particular, the IMS network can add value to the third party Internet service by allowing web content to be delivered to users via the IMS network, or by allowing users of a third party Internet service community to communicate/interact with each other using the real-time capabilities of the IMS network. For example, a department store web site or an e-commerce website may wish to push product information to users, and users may wish to discuss products using real-time multimedia communications. According to this approach, the WSP does not have to invest in (an IMS or other) communications infrastructure, and does not have to manage allocation of IMS IDs.

It is desirable to be able to facilitate such IMS-based communication sessions without overburdening the IMS networks. FIG. 2 illustrates schematically a set of WSPs interacting with an IMS network in order to provide IMS services to their respective user groups.

SUMMARY

According to a first aspect of the present invention there is provided a method of enabling users of a third party Internet service, who are not necessarily subscribers of an IP Multimedia Subsystem, IMS, network, to access services provided by the IMS network. The method comprises registering a user with said third party Internet service via the Internet using an Internet service identity of the user, and sending to the user, from said third party Internet service and via the Internet, IMS network access information. The access information is then used to register the user with the IMS network, wherein, following IMS registration, the user is able to access IMS network services.

Embodiments of the present invention provide for substantially seamless integration of website-based services and IMS networks. In fact, the involvement of the IMS network in the provision of services may be hidden to users in some embodiments.

The IMS network access information may comprise either a temporary IMS user identity or other identifying credential asserted by the third party Internet Service, wherein the user registration with the IMS network requires that the user send to the IMS network said Internet service identity. A mapping may be maintained within the IMS network between said temporary IMS user identity, or a temporary IMS user identity allocated to the user by the IMS network, and said Internet service identity.

The method may comprise sending with said temporary IMS user identity or other identifying credential, an address of an IMS proxy within said IMS network, the user sending an initial IMS Register request to the IMS network using said IMS proxy address. A temporary IMS user identity may be sent to the user from said third party Internet service, and this identity is selected by the third party Internet service from a pool of IMS user identities reserved by the IMS network for said third party Internet Service, these IMS user identities being pre-provisioned in a Home Subscriber Server of the IMS network.

The method may comprise sending to the user with said temporary IMS user identity, an associated IMS credential ("password"), the method further comprising using said associated IMS credential during said step of registering with the IMS network, the IMS network using the associated IMS credential to authenticate the user.

A third party asserted identifying credential ("token") may be sent to the user from said third party Internet service, the user sending this credential to the IMS network at IMS registration, and the IMS network allocating a temporary IMS user identity from a pool of IMS user identities reserved by the IMS network for said third party Internet Service and sending the allocated temporary IMS user identity to the user, the pool of IMS user identities being pre-provisioned in a Home Subscriber Server of the IMS network.

The method may comprise pre-provisioning a pool of IMS user identities in a Home Subscriber Server, HSS, of the IMS network and allocating this pool of user identities to said third party Internet service, said temporary IMS user identity being selected from said pool.

The method may comprise a step of generating said temporary IMS user identity on the basis of said Internet service identity. In a particular embodiment, said IMS user identity comprises an IMS Private User Identity and an IMS Public User Identity.

According to a second aspect of the present invention there is provided a method of establishing a communication session involving a user. The method comprises using the method of any one of the preceding claims to register the user with a third party Internet service provider and with an IMS network, and subsequently initiating a communication session via the IMS network.

Said step of initiating a communication session via the IMS network may comprise sending an IMS session initiation request to a proxy server of the IMS network. Alternatively, said step of initiating a communication session via the IMS network comprises sending an IMS session initiation request to said third party Internet service, and forwarding the request to the IMS network.

The method may comprise sending from said user to said third party Internet service, a request for a temporary IMS user identity of a peer user, the request containing an Internet service identity of the peer user. At the third party Internet service said Internet service identity is used to determine the temporary IMS user identity allocated to the peer user, with that IMS user identity being returned to the requesting user, wherein the user initiates said communication using the received temporary IMS user identity.

Alternatively, the method may comprise using said Internet service identity of the first mentioned user to identify the user to a peer party or parties in the session, the first mentioned user initiating said session using said Internet service identity of the peer user. The method may further comprise using said Internet service identity as a part of a P-Preferred-id or FROM header in an INVITE initiating the communication.

According to a third aspect of the present invention there is provided a user terminal for enabling users of a third party Internet service, who are not subscribers of an IP Multimedia Subsystem, IMS, network, to access services provided by the IMS network. The terminal comprises an Internet service registration unit for registering the user with said third party Internet service via the Internet using an Internet service identity of the user, and a receiver for receiving, from said third party Internet service and via the Internet, IMS network access information. The user terminal further comprises an IMS registration unit for registering the user with the IMS network using said IMS network access information.

The receiver may be configured to receive, with said IMS network access information, an address of an IMS proxy within said IMS network, the IMS registration unit being configured to send an initial IMS Register request to the IMS network using said IMS proxy address. The receiver may also be configured to receive, with said IMS network access information, an identifying credential, the IMS registration unit being configured to send the identifying credential to the IMS network during said step of registering with the IMS network.

The user terminal may comprise an IMS communication establishment unit, the unit being configured either to send a communication initiation request to a proxy server of the IMS network, or to send a communication initiation request to said third party Internet service. The communication establishment unit may be further configured to send, to said third party Internet service, a request for a temporary IMS user identity of a peer user, the request containing an Internet service identity of the peer user, and to receive in response a temporary IMS user identity of the peer user, and to initiate said communication using the received temporary IMS user identity. The communication establishment unit may be configured to initiate said session using an Internet service identity of a peer user.

According to a fourth aspect of the present invention there is provided a web server for enabling users of a third party Internet service who are not subscribers of an IP Multimedia Subsystem, IMS, network, to access services provided by the IMS network. The web server comprises a registration unit for registering a user with said third party Internet service via the Internet using an Internet service identity of the user, and a sending unit for sending to the user IMS network access information. This IMS network access information may comprise an IMS user identity.

According to a fifth aspect of the present invention there is provided a proxy server for use in an IP Multimedia Subsystem, IMS, network. The proxy server comprises a registration unit for registering a user in respect of IMS services, including associating the user with a temporary IMS user identity, and a memory for maintaining a mapping between said temporary user IMS user identity and an Internet service identity. The server further comprises an IMS session handling unit for handling IMS sessions involving said user, including using the Internet service identity in place of said temporary IMS user identity in at least certain IMS signalling messages.

The proxy server may comprise an interface unit for communicating with a Home Subscriber Server of the IMS network in order to provision said mapping in the Home Subscriber Server.

DETAILED DESCRIPTION

Figure 1:
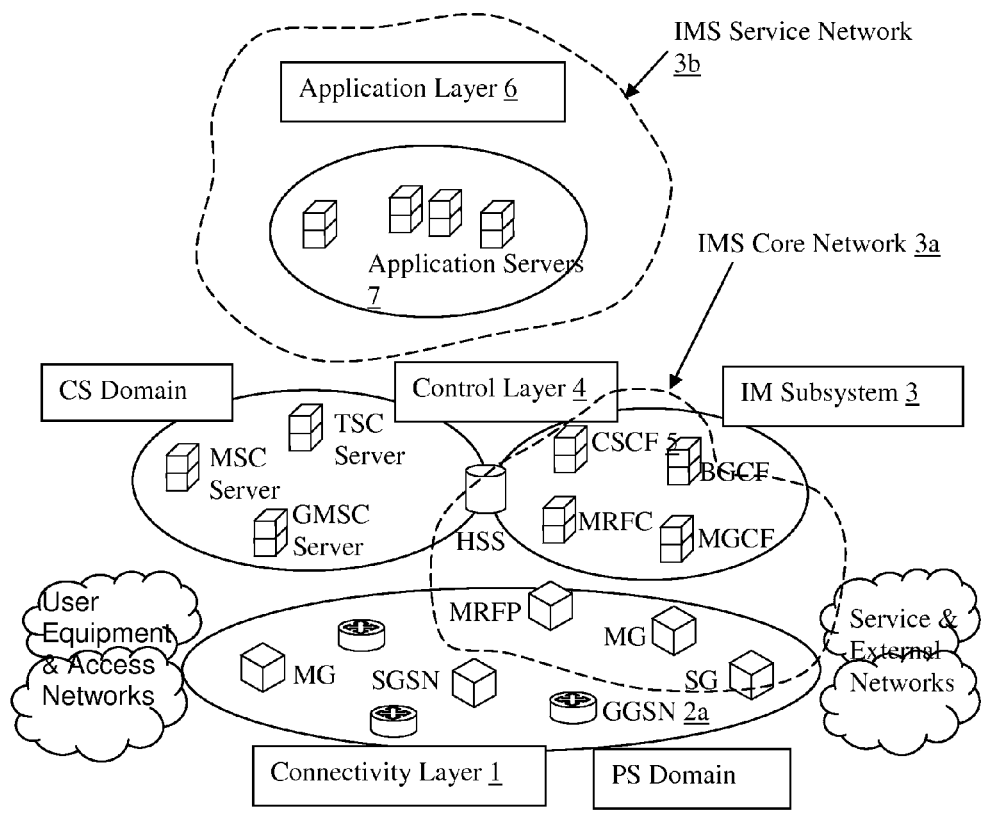
FIG. 1 illustrates schematically a communications system comprising an IMS service architecture integrated with a GPRS packet data access network.
Figure 2:
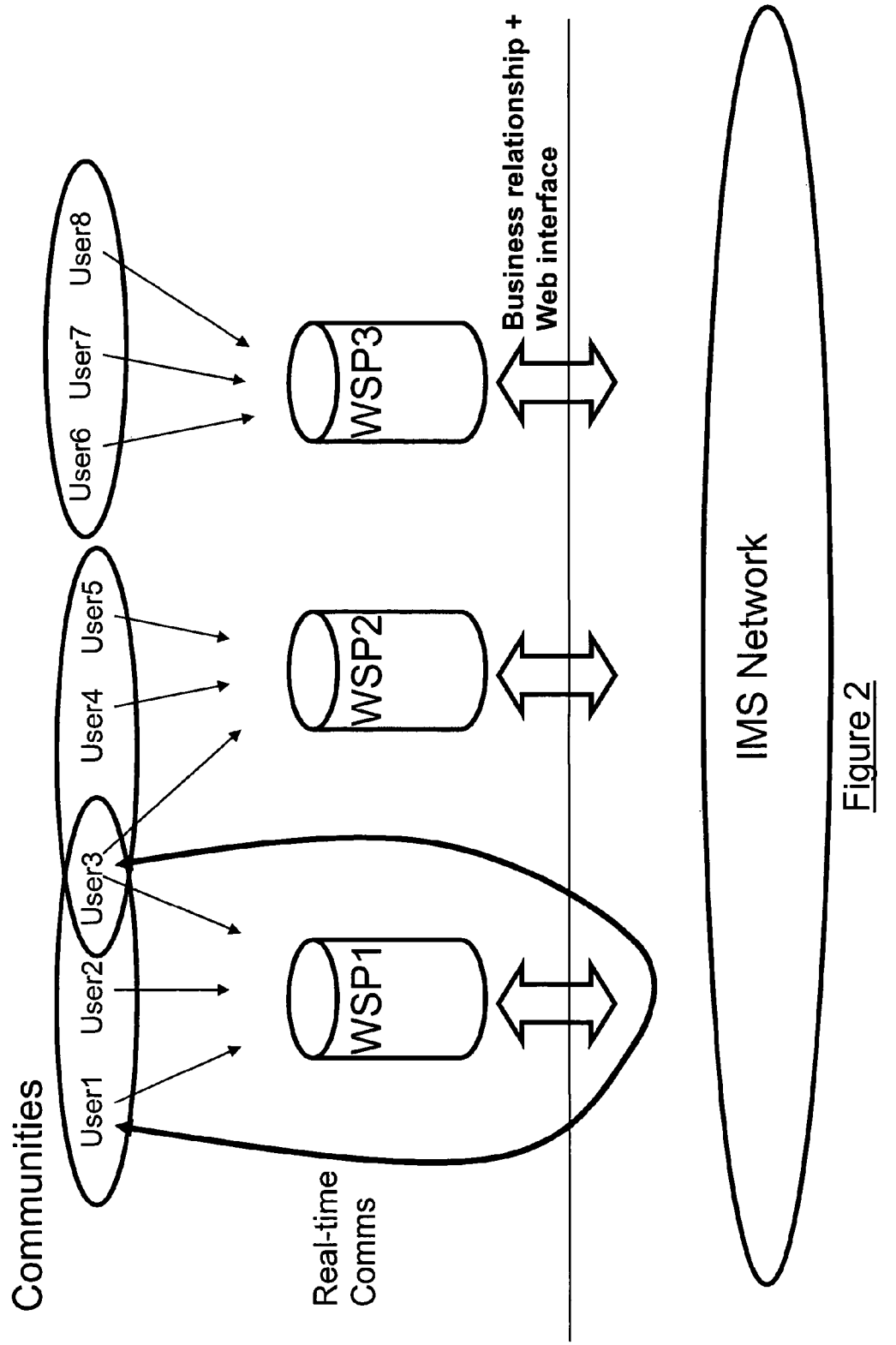
FIG. 2 illustrates schematically a network architecture in which a plurality of WSP users are provided with access to services of an IMS network.

As has been considered above, it is desirable to allow users of Web Service Provider (WSP) services to participate in IMS-based communication sessions in a substantially seamless manner. However, the existing 3GPP specifications assume that the end user has a business (i.e. billing) relationship with the IMS operator and so obtains IMS user identifiers, typically an IMS Private User Identity (IMPI) and one or more IMS Public User Identities (IMPU), directly from the IMS operator. This represents a barrier to the introduction of a seamless WSP/IMS service as the WSP user is unlikely to have a direct business relationship with the IMS operator, even if the WSP itself has a business relationship with the IMS operator. In the following discussion and description, the term "WSP" is used to refer both to a Wireless Service Provider per se, as well as to a web site/service operated by such a provider.

A solution to the above problem is for an IMS network operator to allocate a block of IMS user identities to a given WSP, with these identities being allocated dynamically, and upon demand, to WSP users. The required functionality may be implemented in one or more of the Home Subscriber Server (HSS), Proxy-CSCF (P-CSCF), and Serving-CSCF (S-CSCF). Once a session has ended, the used IMS identities may be returned to the pool for allocation to other WSP users. Of course, it is desirable to allow the WSP users to make use of the IMS services whilst utilising their WSP identities, e.g. so that the IMS identities remain essentially hidden form the WSP users. The current IMS architectural model does not provide a mechanism for managing different sets of user identities in this way. As such, issues that must be addressed to introduce IMS services include:

The allocation of IMS user IDs for use by a third party (e.g. WSP). The allocation needs to consider the fact that IMS IDs consume resources in the IMS operator network, whilst their usage by the third party may be at a relatively low level.

Mapping between third party (WSP) user IDs and IMS user IDs. The mapping needs to be dynamic, so that the usage of the IMS user IDs only occurs when users are active on the WSP web site. The mapping needs to consider invocation of IMS services by third party (WSP) users. IMS communications will act upon IMS user IDs, but communications should appear to end users as acting upon the third party (WSP) user IDs.

An approach that is presented here aims to provide an efficient mechanism for allocating a set of IMS user IDs to a third party (e.g. WSP). The approach allows the IMS Operator to dynamically allocate these IMS user IDs to users of the WSP web-site. The WSP can then provide communication services to its users using sessions established over the IMS network, and, due to the dynamic allocation, keep the total number of IMS identities required to a minimum.

An example of this approach will now be described. It requires in the first instance that the IMS Operator reserve a set of IMS IDs (from an unused pool of IMS IDs—the IMS Operator ensures that these IDs are not to be allocated either for their own use or for use by other WSPs) for use by the WSP. The IMS Operator provisions new "virtual" WSP users in the HSS for the allocated IMS IDs. Typically, one virtual WSP user is provisioned for each IMPI/IMPU pair. At this stage the WSP is not informed of the allocated IMS user IDs.

Consider now a WSP user logging on to the WSP website using any required authentication credentials. After successful log-on, user client software installed in the user's terminal requests the WSP website to enable real-time communications. This will allow the user to have real-time communication with other active users of the website. The website responds to the user request and supplies an authentication "token" and an address of the IMS P-CSCF to be used when initiating an IMS call. The user client software is redirected to the IMS network. The interaction between the user client software and website will typically use HTTP, but the use of other protocols is not precluded.

The user client software now registers with the IMS network. The authentication token and the WSP User ID are included in the REGISTER request, together with a contact address for the user. The IMS network uses the WSP user ID and token to determine that the user is allowed to use the IMS network, and also implements any policy agreed with the WSP such as the maximum number of concurrent users, and then allocates a temporary IMS ID to the user. This is returned as part of the response (200 OK) to the REGISTER request. The IMS network stores the mapping between WSP User ID and the temporary IMS ID (for example in the S-CSCF or HSS).

Figure 3:
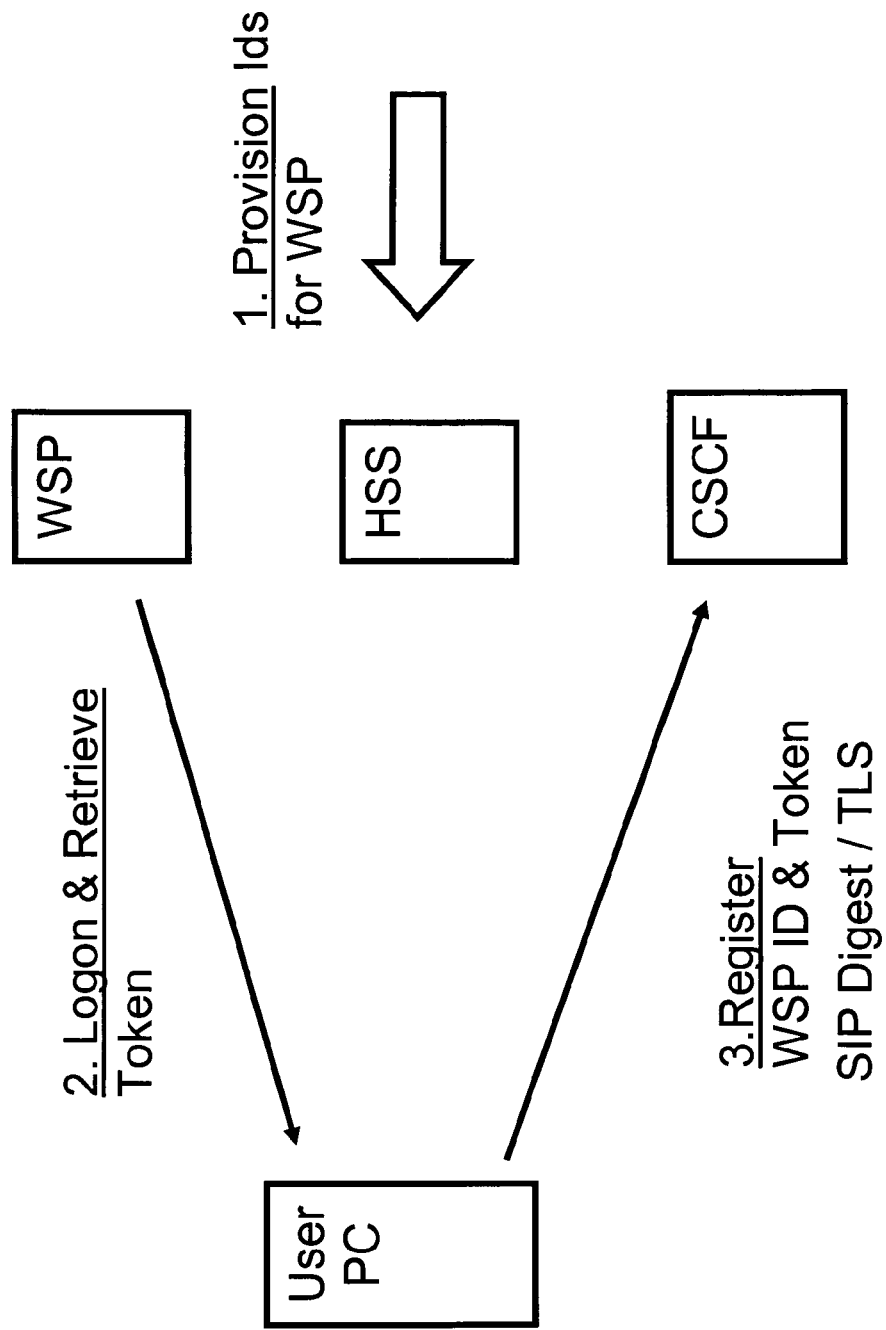
FIG. 3 illustrates schematically an approach to providing IMS service access to WSP users.

FIG. 3 illustrates certain provisioning and user logon steps. The block of IMS IDs are allocated by the IMS Operator to the WSP as part of establishing the business agreement. This requires that the IMS operator ("telco") allocated the address block to the WSP and provisions the HSS with the allocated IDs (step 1). These IDs are now available when the WSP user wants to invoke communications services with other users of the web site community. To use an IMS-based service, a user must first logon to the WSP website and retrieve a token from the WSP (step 2), and then register with the IMS using the WSP ID and the token (step 3) in order to receive a temporary IMS user ID from the IMS network.

When the WSP user wishes to communicate with another WSP user using the IMS communication services, two possible mechanisms are envisaged.

Option 1-Client Based

User A client software initiates an IMS communication (e.g. a voice call) with User B, providing the (temporary) IMS ID of A, and also the WSP user IDs of A and B. The IMS network looks up the temporary IMS ID of B based upon the input WSP user ID of B. The IMS network then completes the IMS communication towards user B.

Option 2-Network Based

User A requests the WSP website to connect him/her to another User B who is active on the website and available for IMS communications. The website initiates a web-services/REST request to the IMS network asking that Users A and B be connected. The IMS Network looks up the temporary IMS IDs of User A and User B and connects the users based upon these IMS IDs. The WSP user IDs of A and B are also supplied in the IMS communication.

When the user's web session is complete and the user logs-off from the WSP web-site, IMS UNREGISTER occurs and the IMS ID temporarily allocated to that user is returned to IMS ID pool for re-allocation to another WSP web-site user. This reduces the number of IMS IDs that the WSP needs to acquire from the IMS operator. Of course, in some cases the WSP may wish to remove a temporary IMS ID from a WSP user prior to the user logging-of the website, or indeed may wish to allow the user to retain the IMS ID for some time after logging-off, e.g. depending on demand.

The approach described above is targeted to communication between users of a closed group, e.g. WSP registered users. However, that is not to say that a user allocated a temporary IMS ID cannot also communicate with another IMS user outside of the group.

The IMS operator knows the mapping between WSP user IDs and IMS user IDs, so can track the usage of real-time communications by the WSP users. This can provide added value to the communications offered by the WSP website. It is possible to identify malicious calls, intercept calls and provide itemized call detail records.

Figure 4:
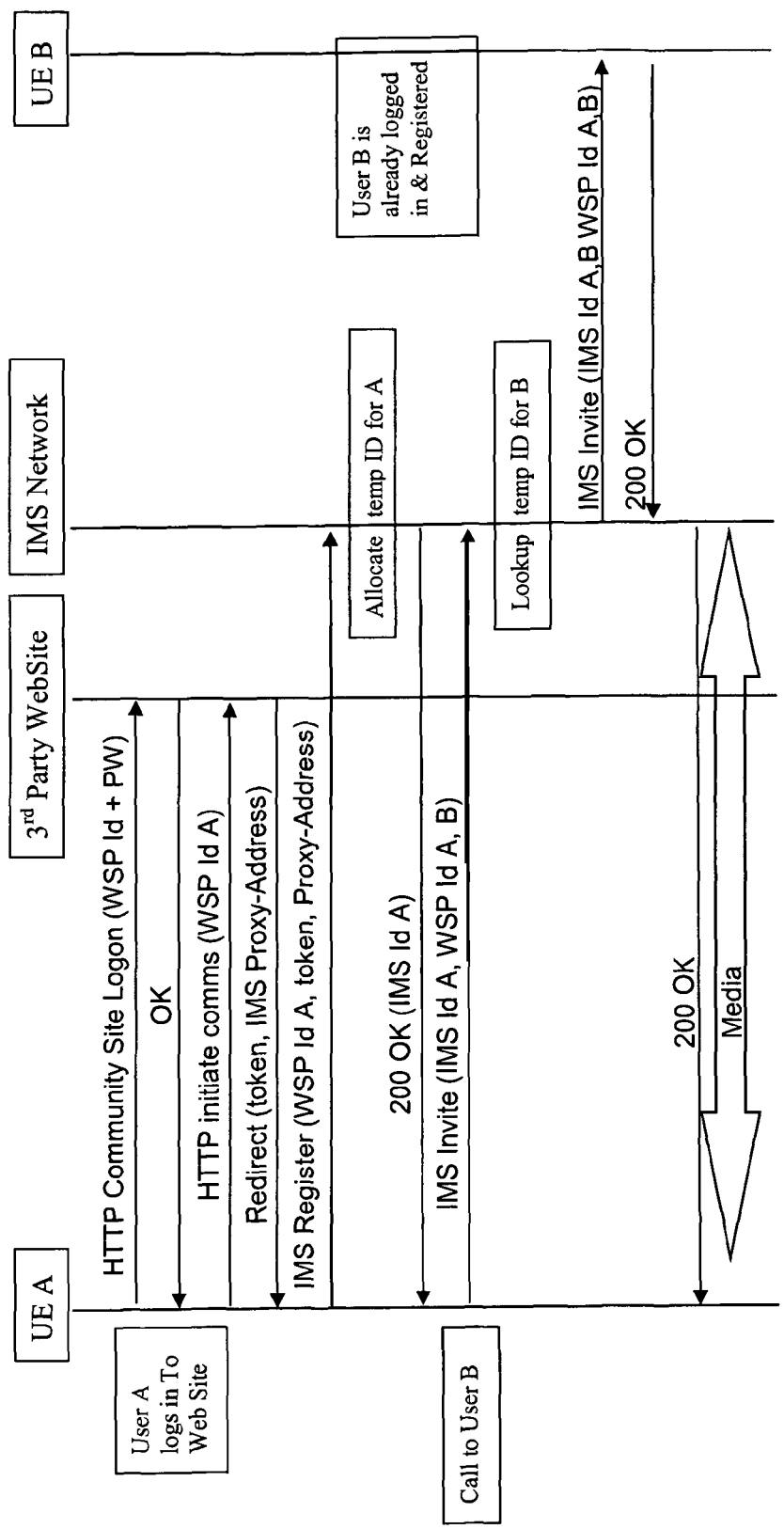
FIG. 4 illustrates in detail a procedure for providing IMS service access to WSP users according to the approach of FIG. 3.
Figure 5:
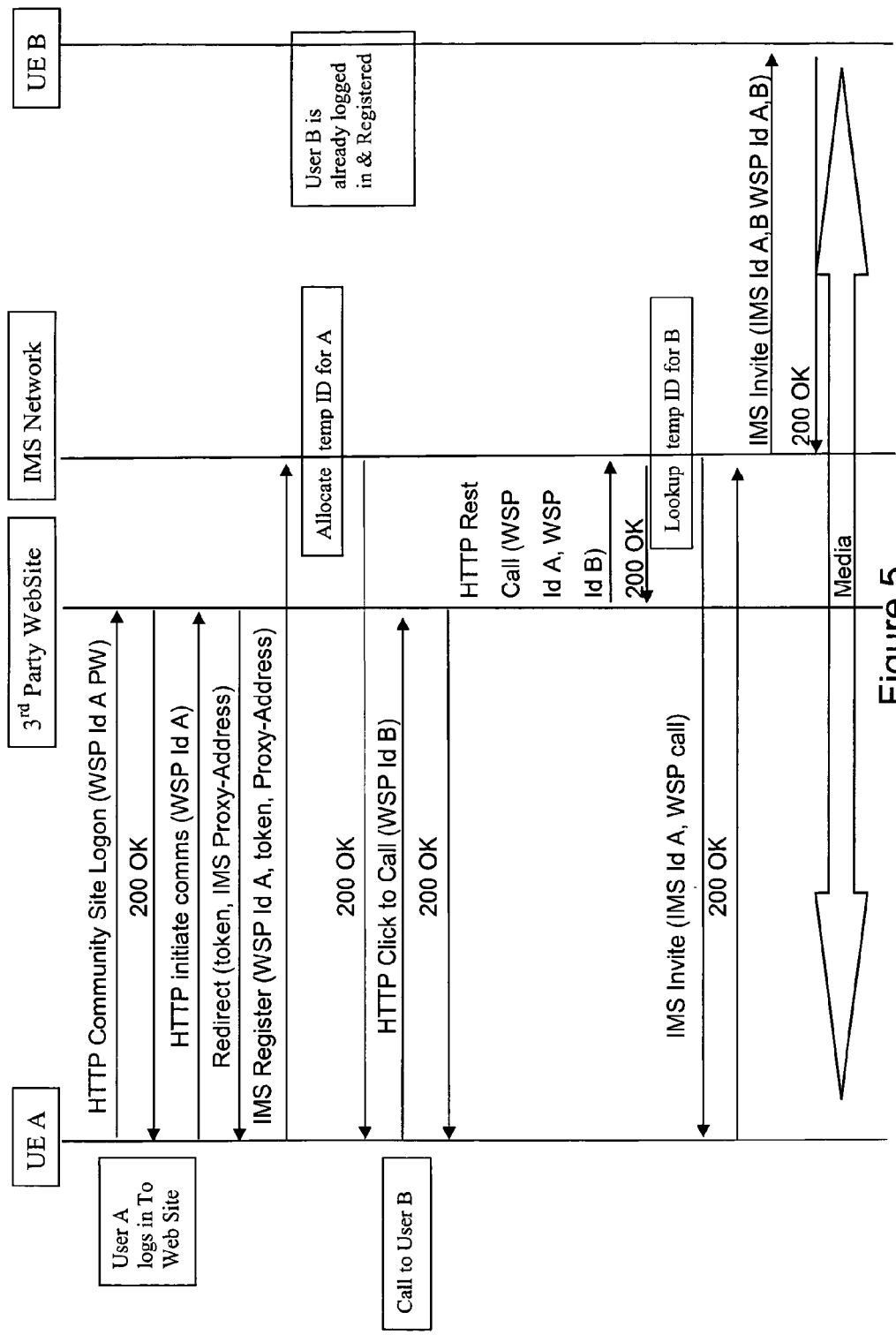
FIG. 5 illustrates in detail an alternative procedure for providing IMS service access to WSP users according to the approach of FIG. 3.

FIG. 4 illustrates the IMS service provision procedure in more detail, in the case of a User A seeking to establish an IMS-based session with a User B. This example relates to a client-based realisation, where the client initiates the IMS communication by sending the IMS INVITE directly to the IMS network. FIG. 5 illustrates an alternative scenario, again for the case of a User B initiating a communication with User B, but where the WSP signals to the IMS network to initiate the session set-up.

Figure 6:
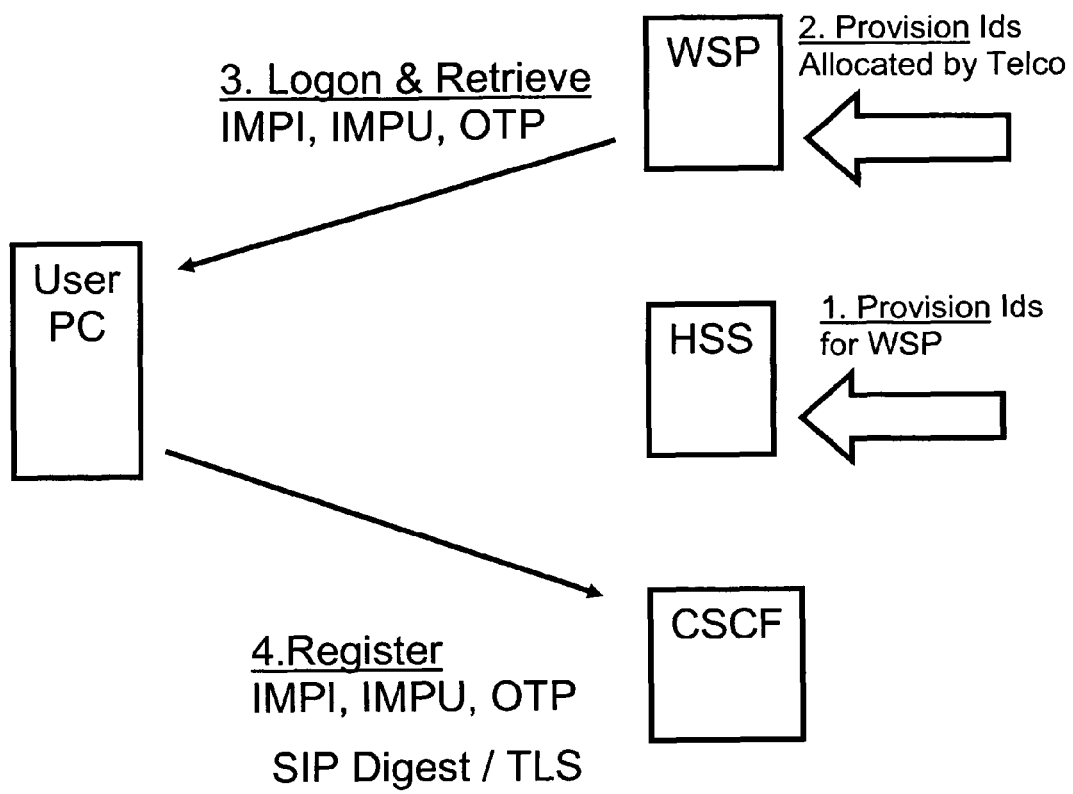
FIG. 6 illustrates schematically an alternative approach to providing IMS service access to WSP users.

An alternative to allowing the IMS network to dynamically allocate the temporary IMS user IDs is to implement this dynamic allocation function within the WSP. Again, the IMS Operator reserves a set of IMS IDs from the unused pool of IMS IDs for use by the WSP. The IMS operator provisions a set of new, virtual users in the HSS. This process is illustrated in FIG. 6 which illustrates the (additional) step of the IMS network ("telco") initially identifying the allocated block of IMS user IDs to the WSP. The WSP provisions these IMS IDs into its website or back-office systems.

After successful log-on by the WSP user, the user client software requests the WSP website to enable real-time communications. The website (and back-office systems if necessary) executes an allocation policy for IMS IDs, and allocates a temporary IMS ID to the user from those available in the pool, and stores the mapping between WSP website user ID and temporary IMS ID. The website responds to the user request and supplies the temporary IMS ID, the associated password ("pw"), and the address of the IMS P-CSCF to be used. This redirects the user client software to the IMS network. The user client software now registers with the IMS network, including the temporary IMS ID and the password in the REGISTER message.

Figure 7:
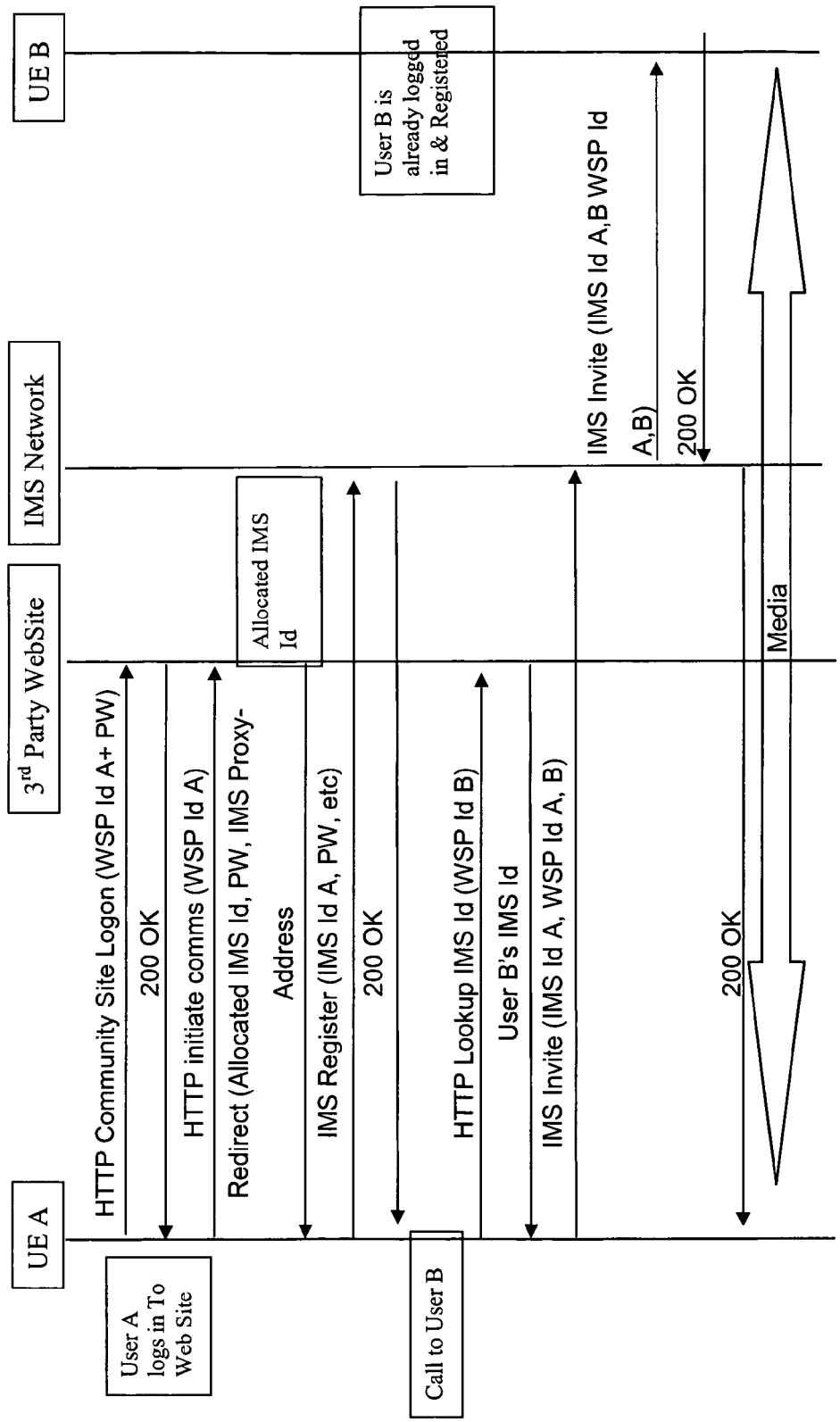
FIG. 7 illustrates in detail a procedure for providing IMS service access to WSP users according to the approach of FIG. 6.
Figure 8:
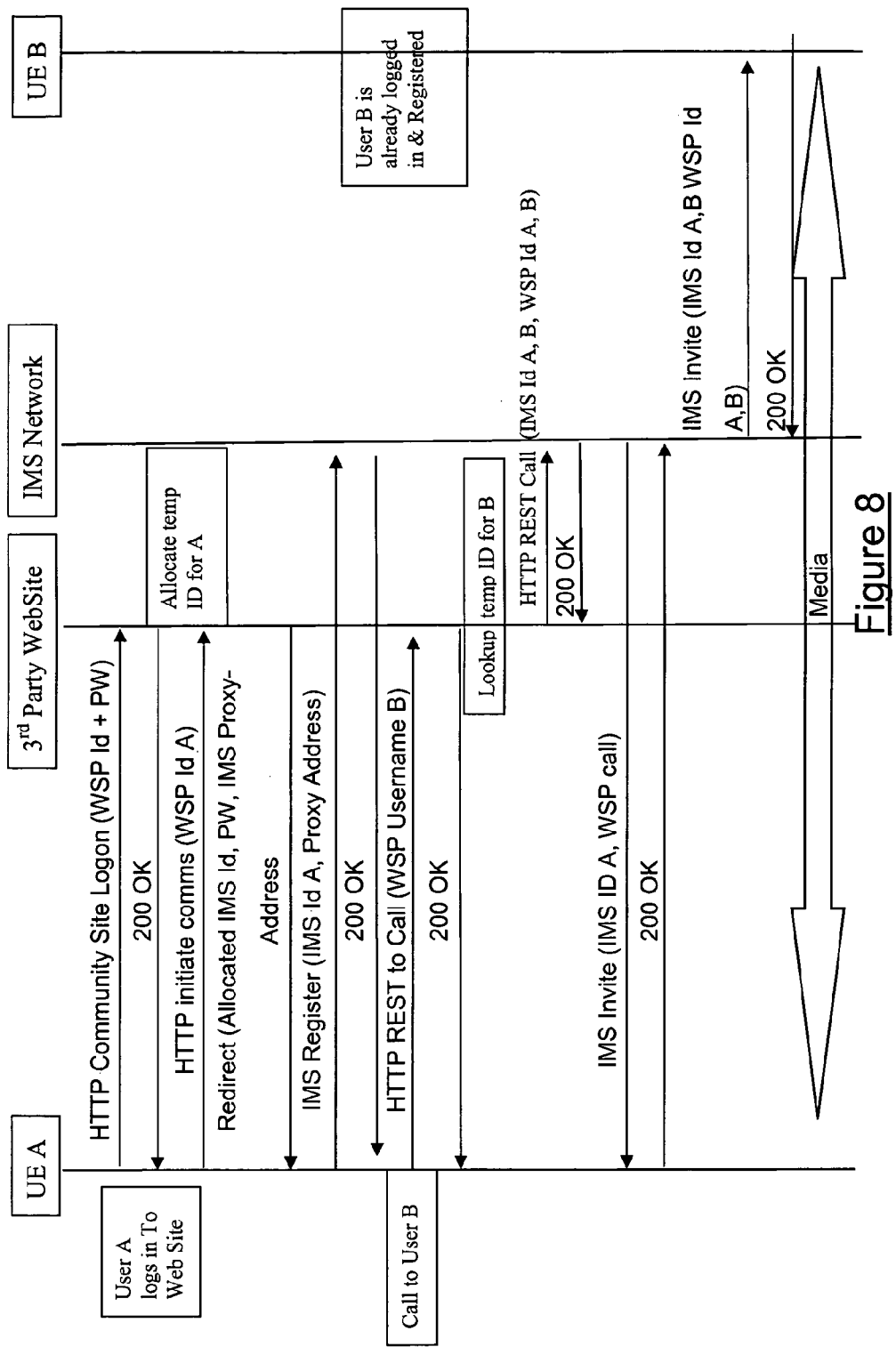
FIG. 8 illustrates in detail a procedure for providing IMS service access to WSP users according to the approach of FIG. 6.

As with the approach described above with reference to FIGS. 3 to 5, i.e. concerning the allocation of IMS IDs by the IMS network, there are two options when it comes to initiation the IMS connection between users (e.g. User A and User B), i.e. a client-based approach and a network-based approach. FIG. 7 illustrates a procedure according to the option 1 approach, where User A obtains User B's temporary IMS ID from the WSP, before sending an INVITE, containing the IMS IDs of both user A and User B, to the IMS network. The INVITE also contains the WSP IDs of both parties. FIG. 8 on the other hand illustrates a procedure according to the option 2 approach, where it is the WSP that is responsible for instructing the IMS network to initiate the IMS connection by sending the HTTP REST to the IMS network, this message including the IMS IDs of user A and user B.

An alternative approach to the temporary allocation of IMS user IDs involves algorithmically deriving these IDs from the WSP user IDs. These algorithmic IMS user IDs are not initially provisioned in the HSS, so do not consume HSS resources. After successful log-on to the WSP website, the user client software requests the WSP website to enable real-time IMS-based communications. The website now requests the IMS network to provision the algorithmic IMS user ID into the HSS. The IMS network provides the allocated IMS ID to the website. The website responds to the user with the algorithmic IMS ID, and the user client software now registers with the IMS network.

The algorithmic approach to IMS user ID allocation may also be employed in the case where the WSP is responsible for IMS user ID allocation. In this case, the algorithm is known both to the IMS operator and to the WSP.

The user client application software required to implement any one of the above approaches may be based around a web browser. Using such a browser, the user is able to access and logon to the WSP website. In order to make use of the enhanced, IMS-based services, new functionality may be required in the browser. For example, a browser plugin may be provided which implements IMS client functionality, and which is responsible for receiving the Redirect response from the WSP, for handling IMS registration, and for initiating the IMS connection. Of course, this new functionality may be implemented by other means, such as a standalone application having an interface with the web browser.

Figure 9:
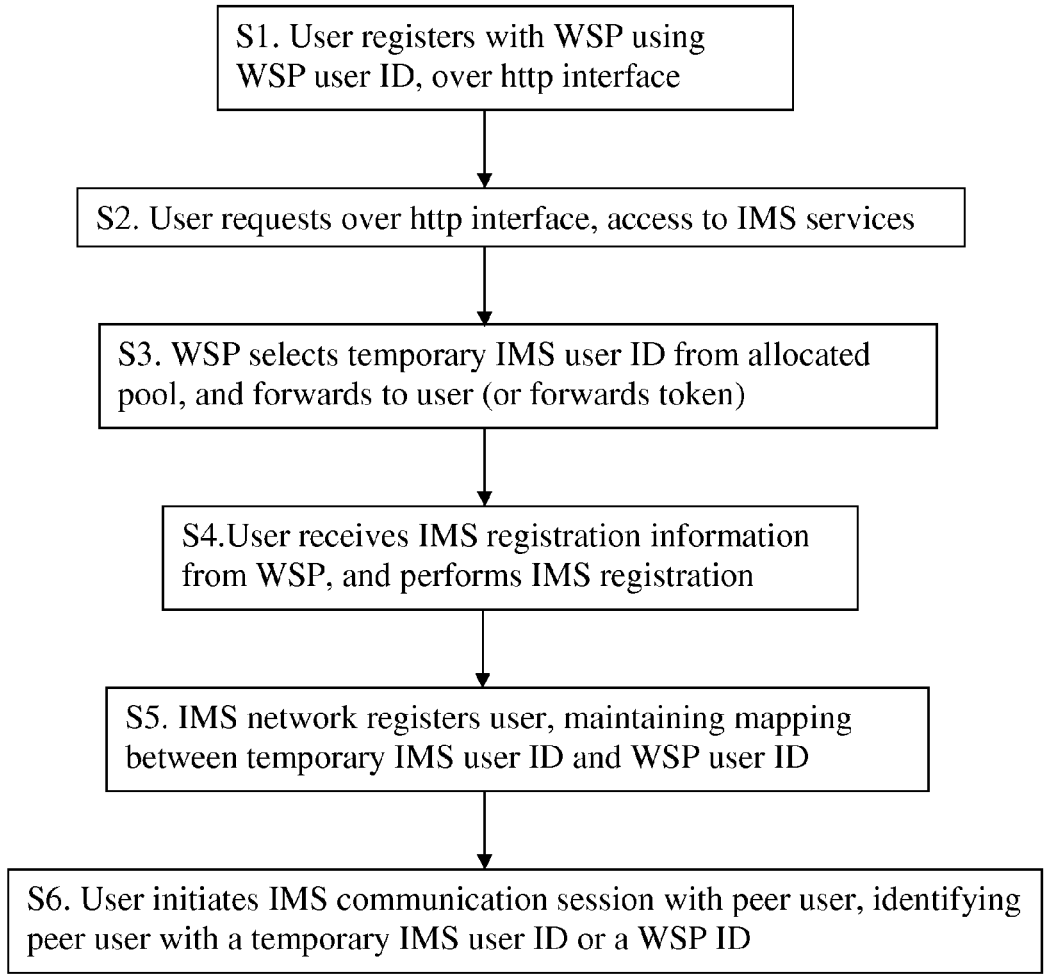
FIG. 9 is a flow diagram illustrating a procedure for providing IMS service access to WSP users.

FIG. 9 is a flow diagram providing a high level illustration of the process for allowing WSP users to access IMS network services. At step S1, the user (terminal) registers with the WSP website using a WSP user identity. At this stage, the user is typically able to access the normal WSP services. However, if the user wishes to access IMS (enhanced) services, then at step S2 the user makes a request for such access. In response to the request, at step S3 the WSP selects a temporary IMS user ID and forwards this to the user. If the IMS allocation approach is employed, then the WSP provides a token to the user. At step S4, the user performs IMS registration using the IMS network access information provided by the WSP. In the event that the WSP has provided only a token to the user, the IMS network selects or generates a temporary IMS ID for the user. At step S5, the IMS network registers the user. This may involve the P-CSCF/S-CSCF interacting with the HSS. The IMS network maintains a mapping between the WSP and IMS user ID. At step S6, and following IMS registration, the user may initiate an IMS communication (either by signalling directly to the IMS network or via the WSP website).

Figure 10:
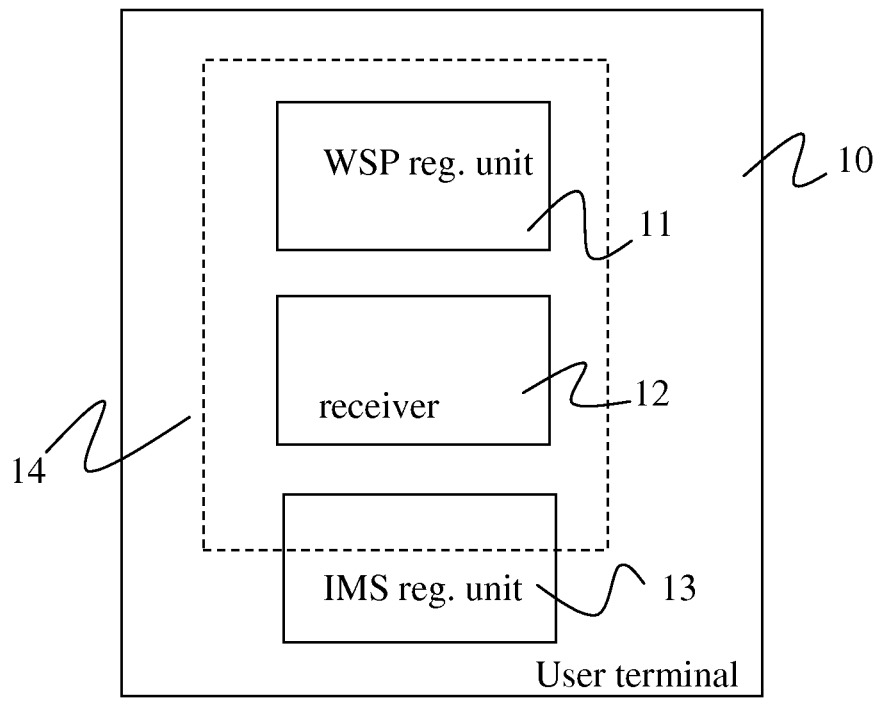
FIG. 10 illustrates schematically a user terminal for use with the procedure of FIG. 9.

Considering now FIG. 10, this illustrates schematically a user terminal 10 suitable for use with the approaches described above. The terminal may be, for example, a computer such as a desktop or laptop pc, or may be a PDA, smartphone etc. The terminal comprises software and hardware implementing: a WSP website registration unit 11; a receiver 12 for receiving, from said third party Internet service and via the Internet, IMS network access information; and an IMS registration unit 13 for registering the user with the IMS network using said IMS network access information. The WSP registration unit and the receiver may be implemented within a web browser 14, whilst the IMS registration unit may be implemented as a web browser plugin.

Figure 11:
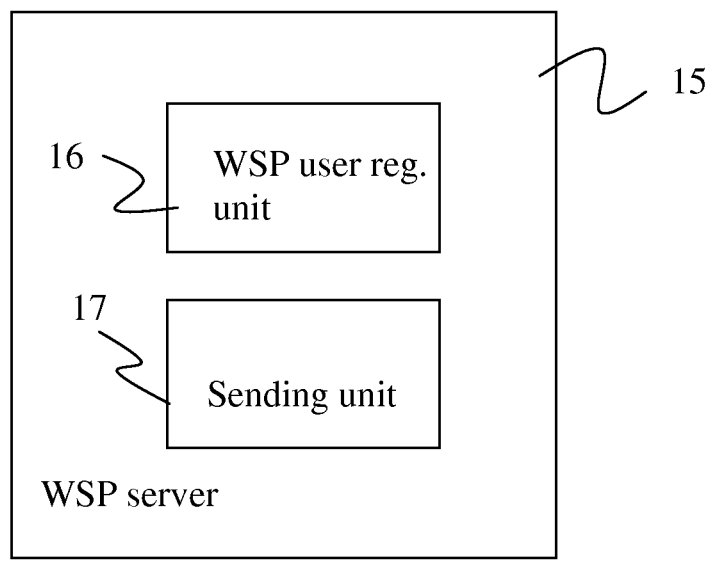
FIG. 11 illustrates schematically a WSP server for use with the procedure of FIG. 9.
Figure 12:
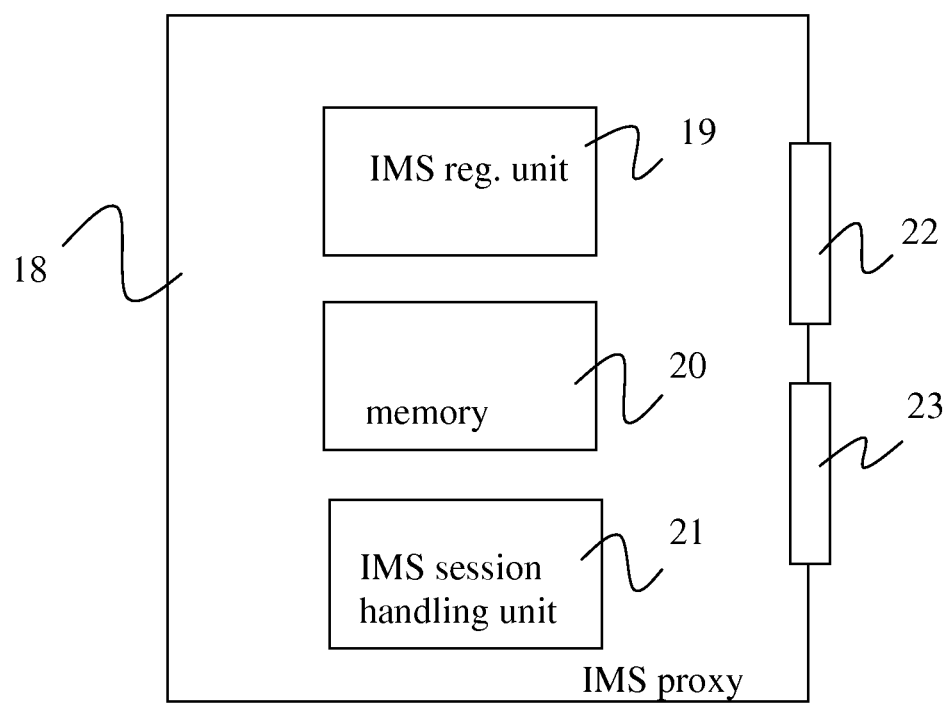
FIG. 12 illustrates schematically an IMS proxy server for use with the procedure of FIG. 9.

FIG. 11 illustrates a WSP server 15, which may comprise software and hardware. The server implements a WSP user registration unit 16 for registering WSP users on the basis of their WSP user identities. The server also comprises a sending unit 17 for handling IMS service requests and for sending to (requesting) users IMS access information (for example a token or IMS user ID). FIG. 12 illustrates schematically an IMS proxy server, e.g. S-CSCF, 18 which again comprises hardware and software components. The proxy server implements an IMS registration unit 19, as well as a memory 20 for storing mappings between WSP user identities and temporary IMS user identities. A (standard) IMS session handling unit 21 is provided for establishing and controlling IMS sessions. The server has a first interface 22 for enabling communication with an HSS (of the IMS network) whilst a second interface 23 allows the server to communicate with the WSP server (if required).

It will be appreciated that various modifications may be made to the above described embodiments without departing from the scope of the present invention.

The invention claimed is:

1. A method of enabling a user of a third party Internet service, wherein the user is not a subscriber of an IP Multimedia Subsystem (IMS) network or is not using an IMS registration, to access services provided by the IMS network, the method comprising:
registering the user with the third party Internet service via the Internet using an Internet service identity of the user;
receiving, from the third party Internet service and via the Internet, IMS network access information, wherein the access information comprises a temporary IMS user identity or authentication token asserted by the third party Internet Service for use by the IMS network in registering the user;
registering the user with the IMS network using the IMS network access information;
wherein, following the IMS registration, the user is able to access IMS network services;
receiving an address of an IMS proxy within the IMS network with the temporary IMS user identity or authentication token;
the user sending an initial IMS Register request to the IMS network using the IMS proxy address;
receiving an associated IMS credential with the temporary IMS user identity; and
sending the associated IMS credential to the IMS network during the registering of the user with the IMS network, the IMS network using the associated IMS credential to authenticate the user.

2. The method of claim 1, wherein registering the user with the IMS network comprises sending, from the user to the IMS network, the Internet service identity.

3. The method of claim 2 further comprising maintaining, within the IMS network, a mapping between the temporary IMS user identity and the Internet service identity, or between a temporary IMS user identity allocated to the user by the IMS network and the Internet service identity.

4. The method of claim 1, further comprising receiving the temporary IMS user identity from the third party Internet service, the temporary IMS user identity being selected from a pool of IMS user identities reserved by the IMS network for the third party Internet Service, the pool of IMS user identities being pre-provisioned in a Home Subscriber Server of the IMS network.

5. The method of claim 1:
wherein registering the user with the IMS network comprises sending the authentication token to the IMS network at IMS registration;
wherein the IMS network allocates the temporary IMS user identity from a pool of IMS user identities reserved by the IMS network for the third party Internet Service, the pool of IMS user identities being pre-provisioned in a Home Subscriber Server of the IMS network; and
wherein receiving the IMS network access information comprises receiving the allocated temporary IMS user identity.

6. The method of claim 1 further comprising:
pre-provisioning a pool of IMS user identities in a Home Subscriber Server (HSS) of the IMS network; and
allocating the pool of user identities to the third party Internet service, the temporary IMS user identity being selected from the pool.

7. The method of claim 1 further comprising generating the temporary IMS user identity based on the Internet service identity.

8. The method of claim 1, wherein the temporary IMS user identity comprises an IMS Private User Identity and an IMS Public User Identity.

9. A method of establishing a communication session, the method comprising:
enabling a user of a third party Internet service, wherein the user is not a subscriber of an IP Multimedia Subsystem (IMS) network or is not using an IMS registration, to access services provided by the IMS network, by:
registering the user with the third party Internet service via the Internet using an Internet service identity of the user;
receiving, from the third party Internet service and via the Internet, IMS network access information, wherein the access information comprises a temporary IMS user identity or authentication token asserted by the third party Internet Service for use by the IMS network in registering the user;
registering the user with the IMS network using the IMS network access information;
receiving an address of an IMS proxy within the IMS network with the temporary IMS user identity or authentication token;

the user sending an initial IMS Register request to the IMS network using the IMS proxy address; and receiving an associated IMS credential with the temporary IMS user identity; and sending the associated IMS credential to the IMS network during the registering of the user with the IMS network, the IMS network using the associated IMS credential to authenticate the user; and subsequently initiating the communication session via the IMS network.

10. The method of claim 9, wherein initiating the communication session via the IMS network comprises sending an IMS session initiation request to a proxy server of the IMS network.

11. The method of claim 9, wherein initiating the communication session via the IMS network comprises sending an IMS session initiation request to the third party Internet service, the third party Internet service forwarding the request to the IMS network.

12. The method of claim 9 further comprising:

sending, from the user to the third party Internet service, a request for a temporary IMS user identity of a peer user, the request comprising an Internet service identity of the peer user, the third party Internet service using the Internet service identity to determine the temporary IMS user identity of the peer user; and receiving the temporary IMS user identity of the peer user from the third party Internet service, wherein the requesting user initiates the communication session using the received temporary IMS user identity.

13. The method of claim 12 further comprising using the Internet service identity of the requesting user to identify the requesting user to a peer party or parties in the communication session, the requesting user initiating the communication session using the Internet service identity of the peer user.

14. The method of claim 13 further comprising using the Internet service identity as a part of a P-Preferred-id or FROM header in an INVITE initiating the communication.

15. A user terminal for enabling a user of a third party Internet service, wherein the user is not a subscriber of an IP Multimedia Subsystem (IMS) network or is not using an IMS registration, to access services provided by the IMS network, the user terminal comprising:

a memory;

a central processing unit (CPU);

an Internet service registration unit configured to register the user with the third party Internet service via the Internet using an Internet service identity of the user;

a receiver configured to receive, from the third party Internet service and via the Internet, IMS network access information, wherein the access information comprises either a temporary IMS user identity or authentication token asserted by the third party Internet Service; and an IMS registration unit configured to register the user with the IMS network using the IMS network access information received from the third party Internet service;

wherein the receiver is further configured to receive an address of an IMS proxy within the IMS network with the temporary IMS user identity or authentication token:

wherein the IMS registration unit is further configured to send an initial IMS Register request to the IMS network using the IMS proxy address;

wherein the receiver is further configured to receive an associated IMS credential with the temporary IMS user identity; and wherein the IMS registration unit is further configured to send the associated IMS credential to the IMS network during the registering of the user with the IMS network, the IMS network using the associated IMS credential to authenticate the user.

16. The user terminal of claim 15 further comprising an IMS communication establishment unit configured to send a communication initiation request to a proxy server of the IMS network, or to send a communication initiation request to the third party Internet service.

17. The user terminal of claim 16, wherein the communication establishment unit is further configured to:

send, to the third party Internet service, a request for a temporary IMS user identity of a peer user, the request containing an Internet service identity of the peer user;

receive in response the temporary IMS user identity of the peer user; and initiate a communication session using the received temporary IMS user identity.

18. The user terminal of claim 16, wherein the communication establishment unit is configured to initiate a communication session using an Internet service identity of a peer user.

* * * * *